US012406395B2

(12) United States Patent
Naveh et al.

(10) Patent No.: US 12,406,395 B2
(45) Date of Patent: Sep. 2, 2025

(54) VEHICLE TO INFRASTRUCTURE EXTRINSIC CALIBRATION SYSTEM AND METHOD

(71) Applicant: Adasky, Ltd., Yokneam Illit (IL)

(72) Inventors: Yoav Naveh, Bahan (IL); Yonatan Dishon, Atlit (IL); Ofer Livny, Zichron Yakov (IL)

(73) Assignee: Adasky, Ltd., Yokneam Illit (IL)

( * ) Notice: Subject to any disclaimer, the term of this patent is extended or adjusted under 35 U.S.C. 154(b) by 734 days.

(21) Appl. No.: 17/643,074

(22) Filed: Dec. 7, 2021

(65) Prior Publication Data

US 2023/0177724 A1   Jun. 8, 2023

(51) Int. Cl.
*G06T 7/80*    (2017.01)
*G06T 7/70*    (2017.01)

(52) U.S. Cl.
CPC .............. *G06T 7/80* (2017.01); *G06T 7/70* (2017.01); *G06T 2207/10048* (2013.01); *G06T 2207/30252* (2013.01)

(58) Field of Classification Search
CPC ... G06T 7/80; G06T 7/70; G06T 2207/10048; G06T 2207/30252; G06T 2207/20081
USPC ........................................................ 382/103
See application file for complete search history.

(56) References Cited

U.S. PATENT DOCUMENTS

| 11,288,522 B2* | 3/2022 | Marschner | G06V 20/588 |
| 11,899,101 B2* | 2/2024 | Rottach | G01S 13/931 |
| 2014/0313347 A1* | 10/2014 | Wu | G06T 7/80 348/187 |
| 2014/0369557 A1* | 12/2014 | Kayombya | G06T 7/73 382/103 |
| 2018/0131924 A1* | 5/2018 | Jung | G01C 21/3848 |
| 2018/0165822 A1* | 6/2018 | Uliyar | G06T 7/62 |

(Continued)

FOREIGN PATENT DOCUMENTS

| CN | 113129382 A | 7/2021 |
| WO | 2021194907 A1 | 9/2021 |

OTHER PUBLICATIONS

B. Caprile & V. Torre. "Using vanishing points for camera calibration" Published: Mar. 1990. https://link.springer.com/article/10.1007/BF00127813.

(Continued)

*Primary Examiner* — Jennifer Mehmood
*Assistant Examiner* — Pardis Sohraby
(74) *Attorney, Agent, or Firm* — M&B IP Analysts, LLC (57) ABSTRACT

A method for calibrating a vehicle to infrastructure system using an infrared camera overlooking a road, comprises: obtaining from the camera a first image, each image of the camera having points identifiable in an image coordinate system and corresponding to objects in a real world scene; identifying in the first image a plurality of points each of which corresponds to a respective object that is touching the road's surface; obtaining a measurement that corresponds to a distance from a location of the camera to each respective one of the points in a camera coordinate system (CCS); determining a model of the road in the CCS based on the points and their obtained distances; and calculating a transformation between the CCS and a world coordinate system (WCS) using the road model, the transformation being usable to determine a distance in the WCS to an object in a second image.

18 Claims, 6 Drawing Sheets

(56) References Cited

U.S. PATENT DOCUMENTS

| | | | | |
|---|---|---|---|---|
| 2020/0339109 | A1* | 10/2020 | Hong | B60W 30/08 |
| 2021/0192788 | A1* | 6/2021 | Diederichs | G01S 17/931 |
| 2021/0300424 | A1* | 9/2021 | McGill | G06N 3/047 |
| 2021/0303871 | A1* | 9/2021 | Janssens | G06T 7/70 |
| 2021/0304492 | A1* | 9/2021 | Xue | H04N 5/2628 |
| 2021/0350572 | A1* | 11/2021 | Wang | G06T 7/20 |

OTHER PUBLICATIONS

Inge Söderkvist. "Using SVD for some fitting problems" Sep. 9, 2021. https://www.ltu.se/cms_fs/1.51590!/svd-fitting.pdf.

Jakub Sochor et al. "Traffic Surveillance Camera Calibration by 3D Model Bounding Box Alignment for Accurate Vehicle Speed Measurement" aBrno University of Technology, Faculty of Information Technology, Centre of Excellence IT4Innovations, Bozet echova 2, 612 66 Brno, Czech Republic. https://arxiv.org/pdf/1702.06451.pdf.

Marketa Dubska, Adam Herout, and Jakub Sochor. Automatic Camera Calibration for Traffic Understanding. Proceedings of the British Machine Vision Conference. BMVA Press, Sep. 2014 http://www.bmva.org/omvc/2014/papers/paper013/index.html.

Neeraj K. Kanhere; Stanley T. Birchfield. "A Taxonomy and Analysis of Camera Calibration Methods for Traffic Monitoring Applications" Apr. 15, 2010. https://ieeexplore.ieee.org/document/5447791.

R. Bhardwaj et al. "AutoCalib: Automatic Traffic Camera Calibration at Scale" BuildSys, Nov. 6-8, 2017, Delft, The Netherlands. https://www.microsoft.com/en-us/research/wp-content/uploads/2017/09/AutoCalib.pdf.

International Search Report and Written Opinion of International Searching Authority for PCT/IB2021/061428, ISA/IL, Jerusalem, Israel Dated: Mar. 9, 2022.

* cited by examiner

VEHICLE TO INFRASTRUCTURE EXTRINSIC CALIBRATION SYSTEM AND METHOD

TECHNICAL FIELD

The present disclosure relates generally to a vehicle to infrastructure system (V2I) and more specifically, to method of providing extrinsic calibration for V2I system employing an infrared camera.

BACKGROUND

Vehicle-to-Infrastructure (V2I) is a communication model that allows vehicles to share information with the infrastructures and components that make up a road system. The components may include traffic lights, lane markers, streetlights, road signs, parking meters, building structures, or the like. Data may be gathered in real-time from sensors mounted on these components and sent to a vehicle over a network to deliver warnings on road conditions, traffic congestion, potential obstacles, and parking availability. Other systems may also use both infrastructure and vehicle data to optimize traffic flow and increase fuel economy of vehicles, while promoting safety to both the driver and the pedestrians on the road.

Typically, sensors used in V2I system include video cameras, radio detection and ranging (RADAR), ultrasonic sensors, and light detection and ranging (LIDAR), and other stationary sensors. Such cameras and/or sensors are placed at fixed locations outside of moving vehicles so as to have good visibility of traffic objects on a road. V2I systems may also provide to vehicles information that cannot be adequately captured by sensors mounted on a vehicle. For example, a V2I system may include an RGB camera that is fixedly mounted on a pole at an intersection. The V2I system is adapted to capture and analyze videos of vehicles and pedestrians approaching the intersection, and to transmit the information to approaching vehicles, e.g., from around a corner.

Since V2I systems are stationary and are not placed on vehicles, the cost of such systems may be shared by the members of the public that use them rather than being borne by individual vehicle owners. V2I systems may augment the analytical capabilities of sensors mounted on vehicles in Vehicle-to-Vehicle (V2V) systems because they may have sensors 1) mounted at view angles and positions not obtainable with V2V systems, 2) with increased sensor sensitivities, 3) enhanced resolutions, 4) increased detection ranges, and 5) a larger field of view which are typically unavailable in V2V systems due to limitations in size, position, location, and cost that apply to systems that are installed on individual vehicles.

There are challenges in identifying elements on the road using an externally mounted camera in a V2I system. To this end, some type of extrinsic calibration, e.g., estimation of camera extrinsic parameters, must be performed to be able to draw conclusions about the 3D world based on what is being seen by the camera. Two broad approaches to determine a static camera's extrinsic calibration parameters previously employed in the art are (1) using known geometric fixtures and (2) using vanishing points.

Camera extrinsic calibration using known geometric fixtures can be performed by using different static features present on the road such as road markings, width of the road, electric poles and so forth. These features must be identified in the camera frame and their coordinates in a world coordinate system (WCS) need to be obtained. Such coordinates have been obtained using various methods such as manual measuring or relying on standards or other existing information. However, static features, such as markers on the road and traffic signs, often, for a time, become occluded from the view of the camera or they become otherwise not available, which can be problematic.

In "AutoCalib: Automatic Traffic Camera Calibration at Scale", many extrinsic calibrations are generated based on key-points identification and using popular car's real 3D dimensions and solvePnP. They are later smartly fused. This technique is more of the using known geometric fixtures type.

The foregoing extrinsic calibration methods are directed to use with conventional sensing modalities, e.g., CMOS cameras, radar, ultrasonic, and LIDAR.

However, the various sensing modalities conventionally used are typically limited in their field of view, and are unable to perform in all-weather conditions. The performance of these devices is particularly poor under foul weather or at night. For example, even during fair weather conditions under bright daylight, video cameras using a CMOS sensor may be rendered useless by glare from sunlight and snow reflection. Also, at night, additional active lighting is necessary for the video camera to discern objects far away, and such lighting may consume much electrical energy. Further, video cameras may not be useful under heavy rain or fog.

Radar, while being able to discern relative speed of objects, is unable to discern details of the objects. Furthermore, ultrasonic sensors can only sense nearby objects and only at low resolutions. Additionally, while LIDAR may be able to create three dimensional images of objects and give depth perception, the range is limited and sensing by LIDAR may be obfuscated in rainy or foggy conditions.

Overall, the various systems described do not work well under compromised weather conditions or at night.

Additionally, when imagers of different modalities are fixed on an infrastructure for an extended period of time, as is the case in V2I applications, noise may build up in the image produced that degrade the quality of the image, making it difficult for the onboard processors to distinguish different objects that are detected over time.

V2I systems that employ an infrared camera may overcome some of these challenges of V2I systems. Such infrared cameras are typically better able to see through fog, haze, dust, rain, light snow, and other visual impairments that a camera based on a CMOS sensor can't see through. They are also not blinded by the sun, oncoming headlights, or other bright objects which create artifacts in an image produced by a camera based on a CMOS sensor. In addition, infrared cameras can see objects that have different temperatures, e.g., vehicles, people, and animals, better than a camera based on a CMOS sensor when visibility is low. However, infrared cameras have difficulty seeing road markings, road signs, turn signals, stop signals, and license plates.

However, common textures visible in the visible spectrum used by CMOS sensors are not visible in thermal images. Therefore, tracking objects is more challenging when using an infrared sensor, especially in tasks like object reidentification, i.e., identifying the same object in at least another frame after the object was initially identified, where the ability to discern subtle details can be crucial.

It would therefore be advantageous to provide a V2I calibration solution that improves over prior art V2I calibration and is also suitable for use with an infrared sensor.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for calibrating a vehicle to infrastructure (V2I) system that is using an infrared (IR) camera overlooking a road. The method comprises: obtaining from the IR camera a first image for use in calibration of the IR camera, each image of the IR camera having points (i) identifiable in an image coordinate system (ICS) and (ii) corresponding to objects in a real world scene captured by the IR camera; identifying in the obtained first image a plurality of points each of which corresponds to a respective object in the real world that is touching a surface of the road; obtaining a measurement that substantially corresponds to a distance from a location of the IR camera to each respective one of the identified points of the plurality in a camera coordinate system (CCS); determining a model of the road that is expressed in the CCS based on the identified points and their respective obtained distances; and calculating a transformation between the CCS and a world coordinate system (WCS) using the road model, whereby the transformation is usable to determine a distance in the WCS to an object detected in a second image obtained from the IR camera.

Certain embodiments disclosed herein also include a method for measuring a distance to an object in the real world based on an image obtained by an infrared (IR) camera overlooking a road. The method comprises: obtaining from the IR camera a first image, each image of the IR camera having points identifiable in an image coordinate system (ICS) and corresponding to objects in the real world scene captured by the IR camera; identifying a plurality of points in the first image, each of the points of the plurality of points corresponding to a respective object in the real world that is touching a surface of the road; obtaining a measurement that substantially corresponds to a distance from a location of the IR camera to each respective one of the identified points of the plurality in a camera coordinate system (CCS); determining a model of the road that is expressed in the CCS based on the identified points and their respective obtained distances; obtaining a second image from the IR camera; recognizing an object in the second image and the coordinates of the object in ICS; and determining a distance to the object in CCS based on the coordinates of the object in ICS and the model of the road.

Certain embodiments disclosed herein also include a system for measuring a distance to an object in the real world, the system comprising: an infrared (IR); camera adapted to be mounted overlooking a road; a processing circuitry; and a memory, the memory containing instructions that, when executed by the processing circuitry, configure the system to: obtain from the IR camera a first image, each image of the IR camera having points identifiable in an image coordinate system (ICS) and corresponding to objects in the real world scene captured by the IR camera; obtain a plurality of identified points in the first image, each of the points of the plurality of identified points corresponding to a respective object in the real world that is touching a surface of the road; obtain a measurement that substantially corresponds to a distance from a location of the IR camera to each respective one of the identified points of the plurality in a camera coordinate system (CCS); determine a model of the road that is expressed in the CCS based on the identified points and their respective obtained distances; obtain a second image from the IR camera; recognizing an object in the second image and the coordinates of the object in ICS; and determining a distance to the object in CCS based on the coordinates of the object in ICS and the model of the road.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for performing extrinsic calibration for a Vehicle to Infrastructure (V2I) system that uses an infrared camera, and in particular, a long wavelength infrared (LWIR) camera which operates using infrared light at a wavelength of about 8-15 µm, which also corresponds to a range of 20 THz to 37 THz. The use of infrared camera allows for detection of, and the estimating of distance to, moving objects, such as vehicles and pedestrians from long range, e.g., up to about 250 m, without need for active lighting, which uses up a lot of energy and creates optical noise for sensors. The image produced by long wave infrared camera is also invariant to other light sources, haze, night light, rain, snow, fog, or other factors that may decrease visibility for other types of imaging systems, such as light detection and ranging (LIDAR). The V2I method and system also includes image processing that enhances both object detection, tracking, and distance determination, which is optimized for camera that is stationary and fixed on a pole.

The V2I extrinsic calibration involves identifying points in an image on the road and pairing such points with a distance measurement from the LWIR sensor, which is typically performed by measurement, e.g., using a range finder or a Lidar scanner. Based on the determined points and distances, an equation representing the plane of the road, i.e., a road plane equation is determined in the camera coordinate system (CCS), which is a three-dimensional coordinate system which can be paired with the LWIR sensor image coordinate system (ICS), as follows: both the CCS and ICS have their X and Y axes collinear and aligned with the image frame but in the CCS the Z-axis of the CCS is normal to the image frame. Thereafter, a determination of the transformation of the rotation and translation (R,t) between CCS and WCS, where R is a matrix and t is a vector. Once these relationships are established, it can be determined where in the real world each point in image is located as long as those points belong to objects touching the road, which may include, vehicles, people, animals and the like.

Figure 1:
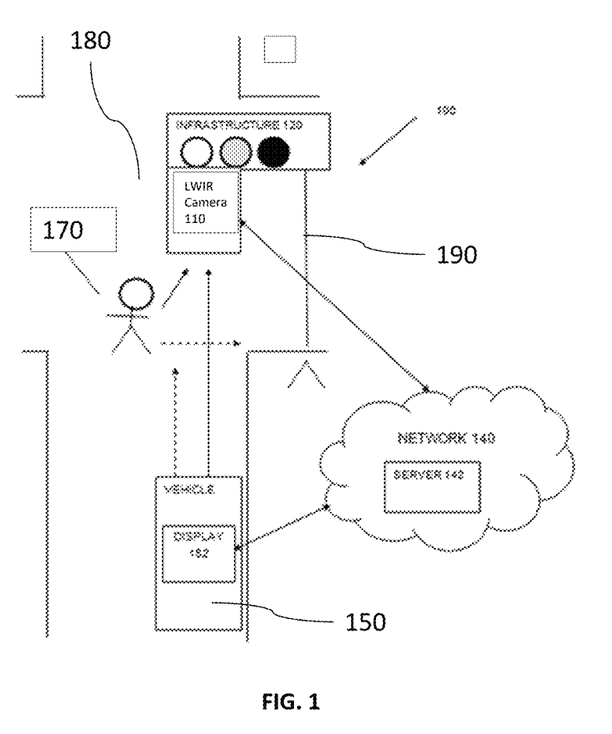
FIG. 1 shows a schematic diagram of an illustrative Vehicle to Infrastructure (V2I) system 100 using an infrared, e.g., LWIR, camera 110, according to an embodiment herein.

FIG. 1 shows a schematic diagram of an illustrative Vehicle to Infrastructure (V2I) system 100 using an infrared, e.g., LWIR, camera 110, according to an embodiment herein. The V2I communication system 100 includes infrared, e.g., LWIR, camera 110, infrastructure 120, network 140, and display 152 located in vehicle 150.

LWIR camera 110 is an infrared imaging device, e.g., an infrared camera, that is adapted to detect infrared images, e.g., using long wavelength infrared spectrum of electromagnetic radiation at a wavelength of about 8-15 µm, which also corresponds to a range of 20 THz to 37 THz, which may be referred to as the "thermal imaging" region. LWIR camera 110 is pointed at a portion of road 160, e.g., in the direction of vehicle 150.

LWIR camera 110 may be mounted, in a fixed position, on preexisting infrastructure 120 or independently mounted in a fixed position on its own mount, e.g., on a pole, installed for the purpose of mounting LWIR camera 110.

Infrastructure 120 may be, but is not limited to, a traffic camera, a road sign, a streetlight, a building, a bridge, toll booths, a parking lot, a charging station, a road marking, and other transportation-related equipment. In FIG. 1, LWIR camera 110 is mounted on infrastructure 120, which is made up of a traffic light fixedly affixed to pole 190.

Network 140 may be, but is not limited to, a wireless, cellular or wired network, a local area network (LAN), a wide area network (WAN), a metro area network (MAN), the Internet, the worldwide web (WWW), similar networks, and any combination thereof. Network 140 may also include a cellular network, e.g., an LTE or a 5G. Also connected to network 140 is server 142. Display 152 may be a screen on the vehicle.

In operation, LWIR camera 110 successively captures an image of an intersection or road section at which it is pointed. As such, it may capture images of pedestrian 170 in the vicinity of road 160 or vehicle 140 along intersection 180 of road 160 with another road. For example, LWIR camera 110 may capture images of a pedestrian crossing the road at intersection 180. As another example, LWIR camera 110 may capture images of a vehicle 150 as it approaches intersection 180. Besides images, whether by itself or in combination with other sensors LWIR camera 110 may also capture other information associated with one or the other or both a vehicle and a pedestrian, depending on who is present in its field of view. In one embodiment, LWIR camera 110 may transfer the images it captures information to the server 142 over the network 130 for processing. The related information may also be transferred to server 142.

Turning to FIG. 1, it shows a coordinate system for use in performing extrinsic calibration for LWIR camera 101 mounted in a fixed location e.g., on pole 103 in accordance with an embodiment. LWIR camera 101 may be any conventional or known LWIR camera, e.g., a camera such as is disclosed in U.S. patent application Ser. No. 17/138,054 filed on Dec. 30, 2020 entitled Vehicle to Infrastructure System and Method With Long Wave Infrared Capability, which is incorporated by reference as if fully set forth herein. Details for internal calibration of LWIR camera 110 that are employed by some embodiments of LWIR camera 110 prior to beginning basic imaging operations may also be found in the above-noted U.S. patent application Ser. No. 17/138,054.

Extrinsic calibration employs at least two, if not three, coordinate systems: 1) the two-dimensional (2D) coordinate system of the image and 2) at least one, if not two, three-dimensional (3D) coordinate systems in the real world. Both of these 3D systems are "right-handed" and the axes in each system are orthogonal to each other.

The first coordinate system is the image coordinate system (ICS) which is a two-dimensional coordinate system defined by the plane of a planar image sensor (not shown) within LWIR camera 110. In one embodiment, the X and Y axes of the ICS coordinate run within the plane of the image sensor, and so define two-dimensional coordinates within an image produced by the image sensor, i.e., by LWIR camera 110.

Figure 2:
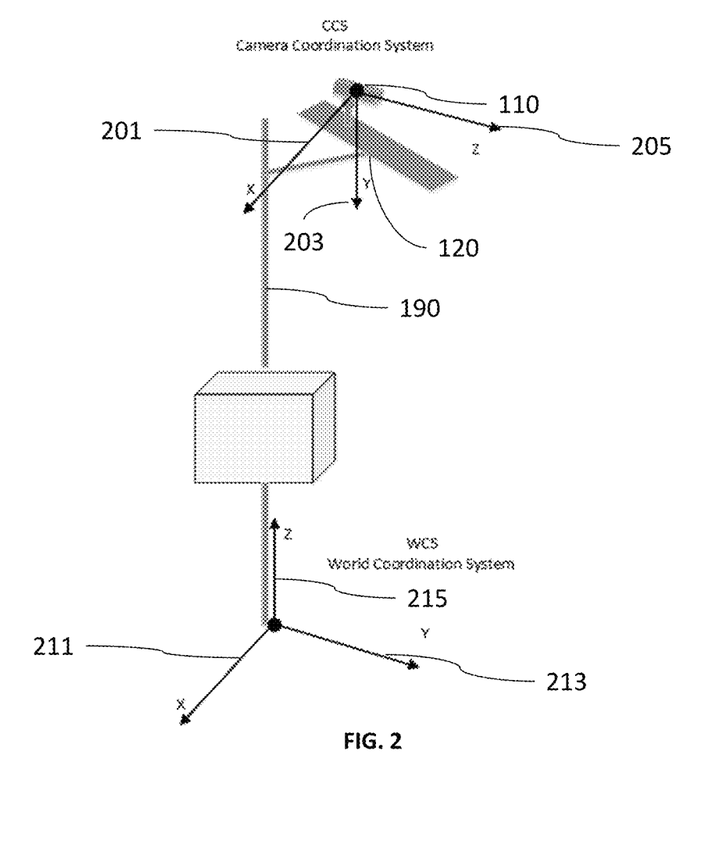
FIG. 2 shows the axes for the CCS and WCS.

The second coordinate system is the camera coordinate system (CCS). The CCS has the following axes: $\hat{x}$→right; $\hat{y}$→down and $\hat{z}$→forward, i.e., outward along the camera focal axis. The origin of the CCS is located at the focal point of LWIR camera 101, i.e., at the focal point of the sensor of LWIR camera 101. Typically this will be at the image center but it may be displaced by a number of pixels, e.g., due to the lens and sensor of the cameral not being perfectly aligned. The displacement is determined via intrinsic camera calibration. At least initially the $\hat{x}$ and $\hat{y}$ axes of the CCS are aligned with the $\hat{x}$ and $\hat{y}$ axes of the ICS. The CCS is shown in FIG. 2, which includes $\hat{x}$-axis 201, $\hat{y}$-axis 203, and Z-axis 205 with respect to LWIR camera 110 mounted on infrastructure 120 which includes pole 290.

The third coordinate system is the world coordinate system (WCS). The world coordinate system (WCS) has the following axes: $\hat{x}$→right; $\hat{y}$→forward; $\hat{z}$→up. The xy plane of the WCS is located along the ground or road plane. The CCS is assumed to have zero roll in respect to WCS. The origin in the WCS is at the vertical projection (along $\hat{z}$ direction in WCS) of the camera focal point on the ground surface, i.e., the vertical projection of the origin of the CSS. The horizontal plane axes $\hat{x}$ and $\hat{y}$ in WCS correspond to the vertical projection of the $\hat{x}$ and $\hat{z}$ axes plane in CCS. That is, if the camera has a horizontal azimuth or yaw angle with respect to the road direction, so will the WCS axes. The WCS is also shown in FIG. 2, which includes $\hat{x}$-axis 211, $\hat{y}$-axis 213, and $\hat{z}$-axis 215. The WCS, which is located on the road, may be useful for transmitting distances of objects to those who need to receive the distance information from the point of view of being on the road as they are on the road, e.g., cars, bicycles, pedestrians, and so forth.

The process of accurately estimating the distance using the CCS of an object recognized in an image captured by LWIR camera 110 based on the information in the 2D image requires the mapping of at least one two-dimensional (2D) image pixel location of the recognized object (x,y) in the image coordinate system (ICS) into a three-dimensional (3D) location in the CCS. Note that the distance, being a scalar, is the same in CCS and WCS. For a passive sensor, i.e., one without active distance measuring ability, such as in the above-described IR camera, this can be achieved by translating (x,y) to the object position on the road. One component required for this translation involves determining the translation and rotation matrices between CCS and the WCS, which can be done via an extrinsic calibration process.

The outputs of the V2I system are given in WCS. This applies to both an object's locations as well as the distance to the object. Distances to objects such as cars and pedestrians may be specified as horizontal distances from the camera's pole base point.

In order to perform the extrinsic calibration, objects existing in the environment, which may be relatively permanently in the environment or simply there transiently, e.g. placed for purpose of performing the extrinsic calibration, that are on the road surface and have known parameters, e.g., distance from the pole on which the camera is mounted, are identified in an extrinsic calibration image and a translation between the object and the image is established. To this end, it is advisable to use objects that have easy to identify characteristics.

Figure 3:
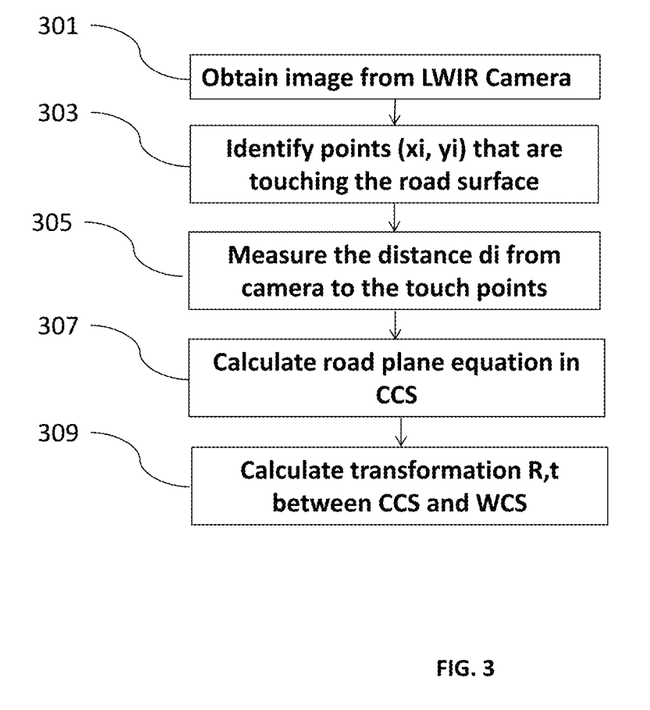
FIG. 3 shows an illustrative process for performing extrinsic calibration.

Extrinsic calibration may be generally performed in accordance with the illustrative process shown in FIG. 3.

First, in step 301, an image is obtained from LWIR camera 110. Next, in step 305, a set of points on the road surface are identified, e.g., by a user performing the calibration, and in step 307 a distance from the camera to each of the identified points is determined, e.g., typically by the user performing the calibration who identifies the points. Preferably 4 of more points should be identified and have their corresponding distance determined.

Figure 4:
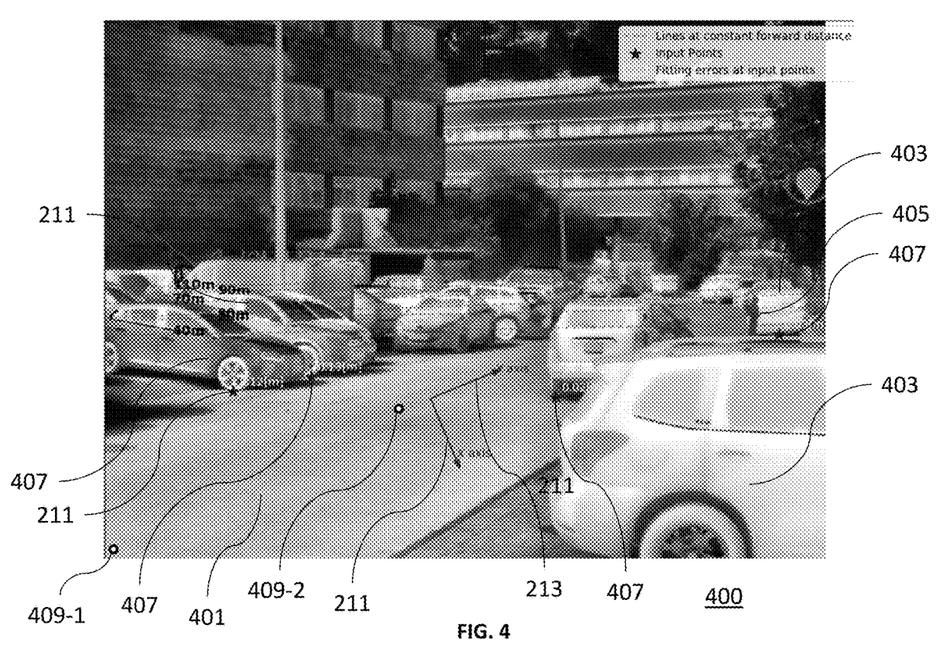
FIG. 4 shows an illustrative image of a road 401 having objects thereon.

The foregoing steps may be performed by having the user who is observing the scene as captured by LWIR camera 110, e.g. on a display screen. FIG. 4 shows an illustrative image 400 of road 401 having objects thereon such as various cars 403 and person 405. First, identify static visible objects that have a visible base on the road or pavement surface, e.g., cars 405. For each such object the user identifies, e.g., clicks on, the points, e.g., the pixel on the screen, on the base of the object, i.e., the place where the object is touching the surface of the road. Four such points 407 are shown in FIG. 4. Then, using a range meter, the user measures the respective distance between LWIR camera 110 and the object, preferably at the point corresponding to the place where the object touches the road surface. The object and its information are then recorded in a geometric calibration table. The user should select around 6 to around 10 objects and no less than 4. The objects should be spread relatively evenly over the road segment visible in the camera image and the objects should be static, i.e., not moving at the time of the calibration. Although not prohibited, it is recommended not to select lane markers or other objects that might not be visible at night time in an infrared image.

In one embodiment, the range may be measured from the camera to an object. This can be achieved by a person who places a rectangular planar 1 m×1 m board at the object base, e.g., the selected point on the object, holds the range meter touching the camera's pole while it is parallel to the ground plane, aims the range meter at the target board, and measures the distance. In another embodiment, the range may be measured from the object to the camera. This can be achieved by attaching a rectangular planar board to the camera pole adjacent to the camera, and then, while standing near the object, aim the range meter to the target board and measure the distance. In yet another embodiment, such boards are not employed and instead static objects already in the scene, preferably objects that are expected to remain substantially stationary within the scene, are employed.

Note that although a camera pole is mentioned above, in the event the camera is not mounted directly on a pole, the location on the ground of the vertical projection of the camera, i.e. the location on the ground where the camera would fall to on the ground if dropped from its mounted location, may be used.

In step 305 the road plane equation is calculated in CCS. This can be done by linear fitting or regression, given at least 4 measurements of points that belong to the road plane, one can fit a linear plane that passes through them, or close to them if more than 4 points are available, as is well known in the art. For example, in one embodiment, given at least 4 measurements of $(x_i, y_i, z_i)$ triplets given in CCS, one can determine parameters a, b, c, d of the following plane equation, given in CCS:

$$ax+by+cz+d=0 \quad (1)$$

In one embodiment, calculating a transformation, $R,t$, between CCS and WCS requires performing an alignment of the Y axis in the WCS with the road direction. To this end, one must first select at least two pixels of the image which mark the centerline of the road at different locations in the image. For this purpose, measuring the distance to the locations indicated by the selected pixels is not required. The points on the centerline should be selected in an order from the nearest to the farthest with respect to the camera location. For example, first point 409-1 of FIG. 4 might be selected, then point 409-2.

Finding the WCS coordinates and the R, t with respect to CCS from distance measurements and pixel locations in ICS may be performed as follows. From the known pinhole camera projection equations, one can find the $x_i^{ccs}$, $y_i^{ccs}$ and $z_i^{ccs}$ in CCS coordinates by solving the following system of equations:

$$x_i^{ccs} = f \frac{x_i}{z_i^{ccs}} \quad (2)$$

$$y_i^{ccs} = f \frac{y_i}{z_i^{ccs}} \quad (3)$$

$$z_i^{ccs} = \sqrt{r_i^2 - x_i^{2ccs} - y_i^{2ccs}} \quad (4)$$

where $(x^i, y^i)$ are the pixel coordinates of a point in ICS and where $r^i$ is the distance between the camera and an object on the road. Next, given at least 4 such measurements (pixel coordinates and distances) one can calculate the corresponding $(x_i^{ccs}, y_i^{ccs}, z_i^{ccs})$, and use the equation (1) to find the values of a, b, c, d.

This equation is the plane equation of the ground plane in CCS, d is the plane distance, i.e. camera height, and $\underline{n}=(a, b, c)$ is the vector normal to the ground plane. $\underline{n}$ corresponds to Z axis 215 in WCS shown in FIG. 2. In this case, the WCS coordinate system is defined such that the WCS origin c is set to be at the bottom of the camera pole, i.e., in a direction $$\hat{n} = \frac{\underline{n}}{\|\underline{n}\|}$$

perpendicular to the ground plane:

$$\underline{c} = -\frac{d}{\|n\|} \cdot \hat{n} \quad (5)$$

Without a loss of generality, the coordinate system WCS may be defined to be with $\hat{z}$ axis pointing in the direction defined by the road plane normal, i.e, $\hat{z}=\hat{n}$.

The second WCS axis, $\hat{k}$ can be obtained by selecting another point on the ground plane $\underline{x}_g=(x_1, y_1, z_1)$ in CCS, such that the resulting vector, defined by:

$$\hat{k} = \frac{\underline{x}_g - \underline{c}}{\|\underline{x}_g - \underline{c}\|} \quad (6)$$

would point along the road direction. Thus $\hat{k}$ is Y axis 213 in WCS as shown in FIG. 2 and FIG. 4. The road direction can be determined by marking two or more points $(x_i, y_i)$ along the road in the image plane, then projecting these points onto the road plane to obtain the corresponding points on the road. This projection can be obtained by solving the following system of equations for $(x^{ccs}, y^{ccs}, z^{ccs})$:

$$x^{ccs} = f\frac{x_i}{z^{ccs}} \quad (7)$$

$$y^{ccs} = f\frac{y_i}{z^{ccs}} \quad (8)$$

$$ax^{ccs}+by^{ccs}+cz^{ccs}+d=0 \quad (9)$$

Each pixel in the image corresponds to a range of distances in the real world. All points $x^{ccs}, y^{ccs}$ that satisfy 7 and 8 describe all the coordinates in CSS that lie on a ray from point x,y in ICS. Then using equation 9 it is determined where the ray intersects the road plane, and then taking the distance from the origin in CSS to that point is the distance in CCS. Since the origin of CCS is at the camera, that is the distance from the camera to the point on the road.

From the foregoing it is clear that a third orthogonal vector to get the coordinate system can be obtained as:

$$\hat{j}=\hat{k}\times\hat{n} \quad (10)$$

$\hat{j}$ is the X axis 211 in WCS of FIG. 2 and FIG. 4. Thus, the WCS is defined in CCS, in terms of the three orthogonal directions given in (12)-(14) and it's origin is located at $\underline{c}$.

To find the transformation R,t between the two coordinate systems, i.e., the transformation of CCS coordinates into WCS ones, it is needed to translate the CCS by the translation $\underline{t}=\underline{c}$ and then rotate it by a rotation matrix M, given by stacking the WCS axes as follows:

$$R=[\hat{j},\hat{k},\hat{n}]^T. \quad (11)$$

Equations (7)-(9) define how to project a point (x,y) given in ICS to the corresponding points $(x^{ccs}, y^{ccs}, z^{ccs})$ on the road in CCS coordinates. The distance is given by the norm $\|x^{ccs}, y^{ccs}, z^{ccs}\|$, because zero point in CCS is located at the camera position.

To go from CCS to WCS one calculates $R*(p^{ccs}-\underline{t})$, where $\underline{t}$ is the origin and p is a point in CCS.

If the road surface is not planar, then modeling it as such will introduce errors. To better model the road in such situations, the road is treated as if it is made up of multiple planar segments. In such a case, the ground plane is the plane immediately below the camera. Note that planar as used herein with regard to the road or a road segment does not mean a flat road or segment with a substantially horizontal orientation but rather a flat road or segment that may have one of a flat, uphill, or downhill orientation. Thus, each segment a road being treated if it is made up of multiple planar segments may each individually have any of the foregoing orientations.

One approach to treating the road as multiple planar surfaces is to divide up the road manually into segments, e.g. three segments. Note that each segment need not have the same length. To fit such a multi-sectional road, in one embodiment, a user would need to provide more input points, i.e., image points and corresponding measurements, e.g., as collected in steps 303 and 305. As possibly many points may be required, the use of LiDAR in this regard is attractive, as LIDAR can easily generate a great number of distance measurements quickly. The process described above for the entire road may simply be repeated for each segment so long as only object points and distances within the particular planar segment being modeled are employed. A person looking at the road can generally make, based on his observation of the road, a fairly accurate determination as to where the dividing lines of the road that separate the segments are.

Figure 5:
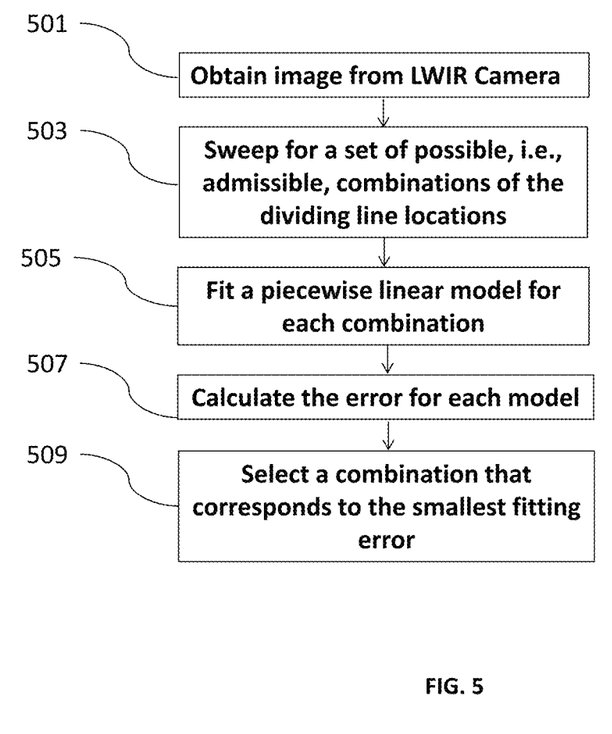
FIG. 5 shows an illustrative process for automatically find the dividing lines to use to divide the road into multiple segments.

FIG. 5 shows an illustrative process for automatically find the dividing lines to use to divide the road into multiple segments. In step 501 an image is obtained from the LWIR camera. Next, in step 503 an automatic sweep is made for a set of possible, i.e., admissible, combinations of the dividing line locations. By admissible it is meant that combinations of the dividing line locations meet certain prescribed criteria, such as the resulting road segments are not too small, that the dividing lines are perpendicular with respect to the road orientation, the dividing lines might be required to be along a prescribed grid, the segments are not too far from the camera, e.g., as set by a prescribed threshold, and so forth. Thereafter, in step 505 a piecewise linear model is fit for each combination. The error for each model is calculated in step 507 and a combination that corresponds to the smallest fitting error is selected in step 509. The search for a correct dividing line combination can be performed exhaustively, i.e., by trying all possible combinations, or incrementally, i.e., by employing a gradient descent based search, where the next line combination is obtained by gradually changing the previous one and stopping when a minimum error is obtained.

Once the plane formula for each road segment is found, including the location of the dividing lines, the distance to a road object can be calculated by using the ray projection given by equations (7)-(9) to each one of the road planes, then selecting only one projection that corresponds to a valid segment, as defined by the segment dividing lines.

Over time it is possible the camera moves somewhat in the short term, e.g., due to vibrations from objects on the road, due to wind, vibration from heavy vehicles, and other similar causes, resulting in a changed camera position and perspective. Typically such motion is small, given that it is the result of natural forces. As a result, the camera sees the scene from a slightly different angle and so becomes out of extrinsic calibration and the road model becomes incorrect. Given that the road is static, it is possible to use the results at the end of the original calibration to serve as a reference and account for such a slightly changed camera position with respect to the reference, and thus perform a dynamic extrinsic calibration.

To this end, at the end of each calibration, e.g., the initial calibration and then thereafter after each subsequent calibration, an entire image of the scene is stored to be used as a reference image. After some time has elapsed, and it is possible that the camera has moved, a new image is obtained. The new image, or a portion thereof, which may be only one or more registered areas therein, is compared to the stored reference image to find where known points in the calibration image have moved to in the newly obtained image, e.g., like finding a motion vector.

Dynamic changes in the image that are attributable to objects, such as cars and people, moving in the scene, weather changes, and so forth, are disregarded. Furthermore, in one embodiment, because the difference in location of static objects is due to the motion of the IR sensor in the IR camera, it is expected that all of the relevant motion vectors, if, for example, detecting motion using a motion vector approach, should be the same. Thus, detected relevant motion that is not the same is also ignored. To this end, for example, when using motion vector techniques it is possible to determine the motion vectors having the most common length and direction and to use the length and direction of such motion vectors as the indication of motion of the IR camera. The motion as determined by such motion vector is then applied to modify, e.g., correct, R,t and determine new values thereof.

Over a longer time it is possible the camera moves somewhat, e.g., due to gravity pulling on it given that it angled downward, due to slight shifts of the pole on which it is mounted which may be caused by thermal expansion and contraction can cause long term changes in camera position and perspective. To deal with such motion it is possible to use a machine learning approach using a model that is trained to estimate distances for known classes of objects to obtain distances to recognized objects of such classes that are on the road in a newly taken image. The obtained distances are then used as if they were the distances obtained as described above by measurement for performing the extrinsic calibration. Such a machine learning approach is disclosed in co-pending U.S. patent application Ser. No. 17/463,783 filed on Sep. 1, 2021 entitled "Forward Collision Warning System" which is incorporated by reference as if fully set forth herein.

As noted above, preferably 4 of more points should be identified and have their corresponding distance determined. The image frame is then stored for use as the reference frame for use with compensating for short term of the camera. This process may be repeated from time to time, e.g., on a substantially regular basis or when it is determined that static objects are no longer located in the image where they were previously known to be.

In one embodiment, the use of the machine learning approach to obtain distance measurements may replace obtaining the measurements as described hereinabove even for an initial calibration.

Figure 6:
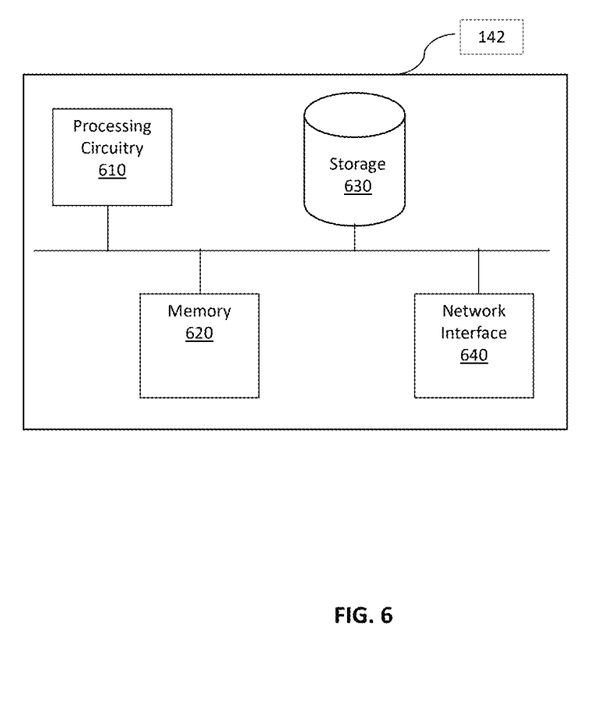
FIG. 6 is an illustrative schematic diagram of a server according to an embodiment.

FIG. 6 is an illustrative schematic diagram of a server 142 according to an embodiment. The system 142 includes a processing circuitry 610 coupled to a memory 620, a storage 630, and a network interface 640. In an embodiment, the components of the server 142 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile, e.g., RAM, etc., non-volatile, e.g., ROM, flash memory, etc., or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by the processing circuitry 610, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the server 142 to communicate for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware executing on hardware, software executing on hardware, software in a, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for calibrating a vehicle to infrastructure (V2I) system that is using an infrared (IR) camera overlooking a road, comprising:
   obtaining from the IR camera a first image for use in calibration of the IR camera, each image of the IR camera having points (i) identifiable in an image coordinate system (ICS) and (ii) corresponding to objects in a real world scene captured by the IR camera;
   identifying in the obtained first image a plurality of points each of which corresponds to a respective object in the real world that is touching a surface of the road;
   obtaining a measurement that substantially corresponds to a distance from a location of the IR camera to each respective one of the identified points of the plurality in a camera coordinate system (CCS);
   determining a model of the road that is expressed in the CCS based on the identified points and their respective obtained distances; and
   calculating a transformation between the CCS and a world coordinate system (WCS) using the road model, whereby the transformation is usable to determine a distance in the WCS to an object detected in a second image obtained from the IR camera;
   wherein calculating a transformation between the CCS and the WCS further comprises aligning a Y axis in the WCS with a direction of the road; and
   wherein aligning of the Y axis in the WCS with a direction of the road further comprises selecting at least two pixels of the first image which are along a centerline of the road but are at different locations in the first image, the points along the centerline being selected in an order from nearest to the location of the camera to farthest from the location of the camera.

2. The method of claim 1, further comprising determining a distance in the WCS to the object detected in the second image obtained from the IR camera.

3. The method of claim 1, further comprising measuring the obtained distance in the real world using at least one distance measuring device.

4. The method of claim 1, further comprising measuring the obtained distance in the real world using a trained machine learning model.

5. The method of claim 1, wherein the model of the road that is expressed in the CCS is determined based on a planar road equation.

6. The method of claim 1, wherein the model of the road comprises a plurality of planar road segments.

7. The method of claim 1, wherein the model of the road is further based on at least two additional points on a centerline of the road at different locations in the first image.

8. The method of claim 1, wherein at a time of obtaining the first image the IR camera had a position and an orientation, the method further comprising:
   obtaining an additional image from the IR camera; and
   modifying the transformation between the CCS and WCS when it is determined based on a comparison of the additional image to a stored version of the first image that the IR camera has been repositioned from the position and orientation at the time of obtaining the stored version of the first image to account for the repositioning of the IR camera;
   wherein the modifying of transformation between the CCS and WCS is performed by applying a corrective factor thereto.

9. A method for calibrating a vehicle to infrastructure (V2I) system that is using an infrared (IR) camera overlooking a road, comprising:
   obtaining from the IR camera a first image for use in calibration of the IR camera, each image of the IR camera having points (i) identifiable in an image coordinate system (ICS) and (ii) corresponding to objects in a real world scene captured by the IR camera, wherein at a time of obtaining the first image the IR camera had a position and an orientation;
   identifying in the obtained first image a plurality of points each of which corresponds to a respective object in the real world that is touching a surface of the road;
   obtaining a measurement that substantially corresponds to a distance from a location of the IR camera to each respective one of the identified points of the plurality in a camera coordinate system (CCS);
   determining a model of the road that is expressed in the CCS based on the identified points and their respective obtained distances;
   calculating a transformation between the CCS and a world coordinate system (WCS) using the road model, whereby the transformation is usable to determine a distance in the WCS to an object detected in a second image obtained from the IR camera;
   obtaining an additional image from the IR camera; and
   modifying the transformation between the CCS and WCS when it is determined based on a comparison of the additional image to a stored version of the first image that the IR camera has been repositioned from the position and orientation at the time of obtaining the stored version of the first image to account for the repositioning of the IR camera;
   wherein the modifying of the transformation between the CCS and WCS is performed by:
      identifying in the obtained additional image a plurality of points each of which corresponds to a respective object in the real world that is touching a surface of the road, each respective object being recognized by a trained machine learning model;
      obtaining from the trained machine learning model a measurement that substantially corresponds to the distance from the location of the IR camera to each respective one of the identified points of the plurality of points of the additional image in a camera coordinate system (CCS);

determining a revised model of the road that is expressed in the CCS based on the identified plurality of points of the additional image and their respective obtained distances; and calculating a modified transformation between the CCS and a world coordinate system (WCS) using the revised road model.

10. The method of claim 9, further comprising measuring the obtained distance in the real world using at least one distance measuring device.

11. The method of claim 9, further comprising measuring the obtained distance in the real world using a trained machine learning model.

12. The method of claim 9, wherein the model of the road that is expressed in the CCS is determined based on a planar road equation.

13. The method of claim 9, wherein the model of the road comprises a plurality of planar road segments.

14. The method of claim 9, wherein the model of the road is further based on at least two additional points on a centerline of the road at different locations in the first image.

15. A method for measuring a distance to an object in the real world based on an image obtained by an infrared (IR) camera overlooking a road, comprising:

obtaining from the IR camera a first image, each image of the IR camera having points identifiable in an image coordinate system (ICS) and corresponding to objects in the real world scene captured by the IR camera;

identifying a plurality of points in the first image, each of the points of the plurality of points corresponding to a respective object in the real world that is touching a surface of the road;

obtaining a measurement that substantially corresponds to a distance from a location of the IR camera to each respective one of the identified points of the plurality in a camera coordinate system (CCS);

determining a model of the road that is expressed in the CCS based on the identified points and their respective obtained distances;

obtaining a second image from the IR camera;

recognizing an object in the second image and the coordinates of the object in ICS;

determining a distance to the object in CCS based on the coordinates of the object in ICS and the model of the road;

calculating a transformation between the CCS and a world coordinate system (WCS) using the road model; and modifying the transformation between the CCS and WCS when it is determined based on a comparison of an additional image obtained from the IR camera to a stored version of the first image that the IR camera has been repositioned from the position and orientation at a time of obtaining the stored version of the first image to account for the repositioning of the IR camera;

wherein the modifying of the transformation between the CCS and WCS is performed by:

identifies in the obtained additional image a plurality of points each of which corresponds to a respective object in the real world that is touching a surface of the road, each respective object being recognized by a trained machine learning model;

obtaining from the trained machine learning model a measurement that substantially corresponds to the distance from the location of the IR camera to each respective one of the identified points of the plurality of points of the additional image in a camera coordinate system (CCS);

determining a revised model of the road that is expressed in the CCS based on the identified plurality of points of the additional image and their respective obtained distances; and calculating a modified transformation between the CCS and a world coordinate system (WCS) using the revised road model.

16. The method of claim 15, further comprising determining a distance to the object in WCS by applying the calculated transformation between CCS and WCS to the distance determined in the CCS.

17. A system for measuring a distance to an object in the real world, the system comprising:

an infrared (IR) camera adapted to be mounted overlooking a road;

a processing circuitry; and a memory, the memory containing instructions that, when executed by the processing circuitry, configure the system to:

obtain from the IR camera a first image, each image of the IR camera having points identifiable in an image coordinate system (ICS) and corresponding to objects in the real world scene captured by the IR camera;

obtain a plurality of identified points in the first image, each of the points of the plurality of identified points corresponding to a respective object in the real world that is touching a surface of the road;

obtain a measurement that substantially corresponds to a distance from a location of the IR camera to each respective one of the identified points of the plurality in a camera coordinate system (CCS);

determine a model of the road that is expressed in the CCS based on the identified points and their respective obtained distances;

obtain a second image from the IR camera;

recognizing an object in the second image and the coordinates of the object in ICS; and determining a distance to the object in CCS based on the coordinates of the object in ICS and the model of the road;

calculate a transformation between the CCS and a world coordinate system (WCS) using the road model; and modify the transformation between the CCS and WCS when it is determined based on a comparison of an additional image obtained from the IR camera to a stored version of the first image that the IR camera has been repositioned from the position and orientation at a time of obtaining the stored version of the first image to account for the repositioning of the IR camera;

wherein to modify the transformation between the CCS and WCS the system:

identifies in the obtained additional image a plurality of points each of which corresponds to a respective object in the real world that is touching a surface of the road, each respective object being recognized by a trained machine learning model;

obtains from the trained machine learning model a measurement that substantially corresponds to the distance from the location of the IR camera to each respective one of the identified points of the plurality of points of the additional image in a camera coordinate system (CCS);

determines a revised model of the road that is expressed in the CCS based on the identified plurality of points of the additional image and their respective obtained distances; and calculates a modified transformation between the CCS and a world coordinate system (WCS) using the revised road model.

18. The system of claim 17, wherein the system is further configured to determine a distance to the object in WCS by applying the calculated transformation between CCS and WCS to the distance determined in the CCS.

* * * * *